PRESSURE REGULATING SLIDE VALVE, ESPECIALLY FOR AUTOMATIC CONTROL MECHANISMS FOR SHIFTING THE GEARS OF MOTOR VEHICLES
Filed June 8, 1959
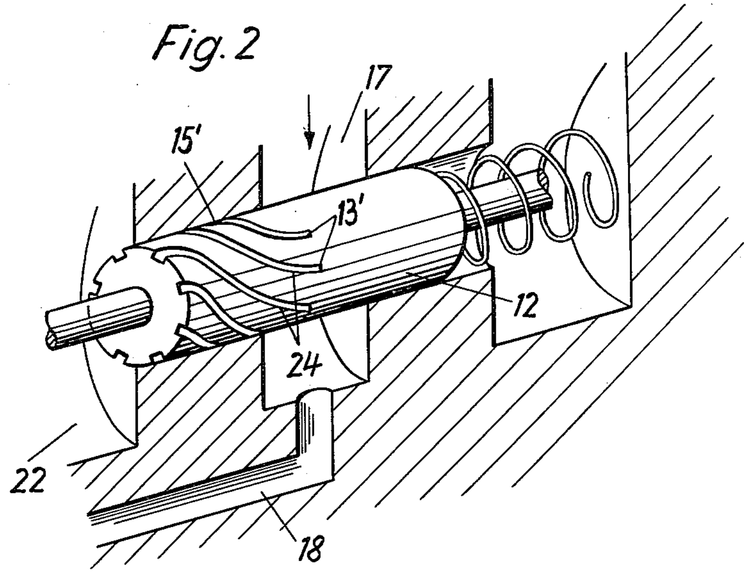
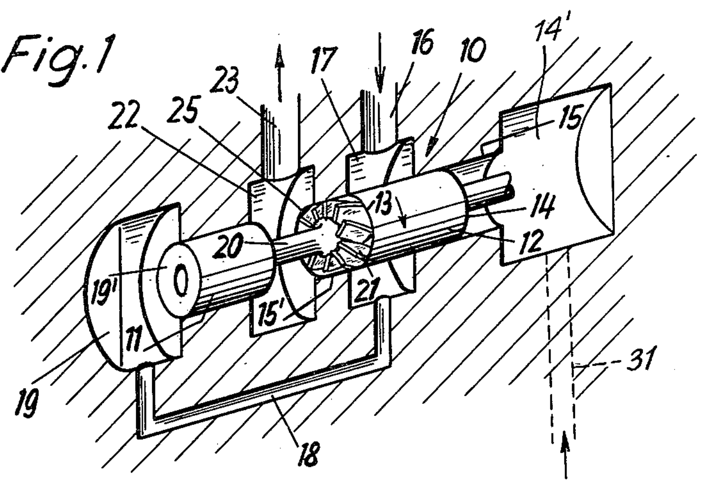
INVENTORS
FRIEDRICH W. SCHÖLLHAMMER
GEORG ELTZE
BY
Dicke, Craig and Freudenberg
ATTORNEYS United States Patent Office 3,051,191

Patented Aug. 28, 1962

3,051,191

PRESSURE REGULATING SLIDE VALVE, ESPECIALLY FOR AUTOMATIC CONTROL MECHANISMS FOR SHIFTING THE GEARS OF MOTOR VEHICLES

Friedrich W. Schöllhammer, Stuttgart-Bad Cannstatt, and Georg Eltze, Stuttgart-Riedenberg, Germany, assignors to Daimler-Benz Aktiengesellschaft, Stuttgart-Unterturkheim, Germany Filed June 8, 1959, Ser. No. 818,809
Claims priority, application Germany June 11, 1958
5 Claims. (Cl. 137—332)

The present invention relates to a pressure regulating slide valve, especially for automatic control mechanisms for shifting the gears of motor vehicles, and more particularly to such a slide valve which is designed not only to carry out a movement in the axial direction but also a rotary movement produced by a turbine operated by the pressure medium which is to be controlled.

The general idea to impart a rotary movement to a pressure regulating slide valve for a hydraulic control mechanism in order to prevent a static friction and the resulting binding action on the slide valve is already known as such. In one prior device of this type, the slide valve was provided with a turbine wheel which was disposed in a by-pass of the controlled pressure medium. This had the disadvantages that an additional friction occurred between the turbine wheel and the longitudinally slidable shaft of the slide valve and that additional space was required for the by-pass in the form of pipe lines or bores within the valve housing.

It is an object of the present invention to provide a pressure regulating slide valve which eliminates the mentioned disadvantages by operating the turbine wheel directly by means of the current of the pressure medium flowing off past a control edge of the slide valve.

One preferred embodiment of the invention consists in providing a set of turbine blades on at least one part of the slide valve directly adjacent to the control edge of the control piston and so as to extend into a bore in the valve housing which has a diameter substantially corresponding to that of the control piston, so that the pressure medium will flow in the axial direction and thereby act upon the turbine blades to rotate the entire slide valve. Another preferred embodiment of the invention consists in extending the length of the control piston into the bore in the valve housing and in providing the extended part with helical grooves starting from the effective end of the piston so that this start of the helical grooves functions as the control edge of the piston.

In these embodiments, the turbine blades or the helical grooves are disposed at the side of the bore of the valve housing directly adjacent to the control piston where the pressure medium enters into the bore. They may, however, be provided at another suitable point on the slide valve or on an additional piston thereon as long as the flow of the pressure medium through the valve housing will act directly on such blades or helical grooves to effect the desired rotary movement of the slide valve.

The slide valve according to the invention may be designed so that the turbine blades or the grooved portion form an integral part of the control piston on the valve body or, in other words, that they are machined out of one piece with the control piston. The slide valve may, however, also be made of several elements in which the control piston is mounted on or forms an integral part of one element, while the turbine part is mounted on or forms an integral part of the second element, and the two elements are secured to each other within a plane which coincides with the control edge of the control piston. The turbine part, that is, the turbine wheel or the cylindrical part which is provided with the helical grooves, may also be manufactured as a separate element and be secured to the valve shaft carrying the control piston. Thus, for example, it may be secured to the shaft carrying the actual control piston at a point between that piston and a secondary control piston.

These and other objects, features, and advantages of the present invention will become further apparent from the following detailed description thereof, particularly when read with reference to the accompanying drawings, in which—

FIGURE 1 shows a diagrammatic perspective view of a slide valve according to the invention provided with a turbine wheel; while FIGURE 2 shows a similar view of a slide valve in which the turbine portion consists of a cylindrical member which is provided with helical grooves.

Referring to the drawings, and first particularly to FIGURE 1, the pressurg-regulating slide valve 10 according to the invention consists of two pistons 11 and 12 which are connected by a common shaft 20 of a smaller diameter. The front edge 13 of one end surface of piston 12 serves as a control edge, while the other end surface 14 of piston 12 is acted upon by a constant resilient force, for example, a suitable spring, as illustrated in FIGURE 2, or a suitable servo-pressure as illustrated in FIGURE 1 wherein pressure may be supplied to chamber 14′ through conduit 31. The entire pressure-regulating slide valve 10 is disposed within a continuous bore 15 in the valve housing.

The pressure medium to be regulated by slide valve 10 enters through an inlet channel 16 in the valve housing into an annular chamber 17 and then passes through a connecting conduit 18, which may also extend centrally through slide valve 10, to another annular chamber 19 in which it acts upon the left end surface 19′ of the other piston 11. The operating pressure thus acts upon the slide valve in a direction opposite to the servo-pressure or the spring force acting upon the right end surface 14 of piston 12 so as to increase or decrease the flow of pressure medium, for example, oil, through the valve in accordance with the inlet pressure exerted thereby upon the end surface 19′ of piston 11. Thus, if, for example, the pressure in inlet channel 16 decreases, the control edge 13 on piston 12 will reduce the flow until the pressure again increases to the required value.

Directly adjacent to the control edge 13 of piston 12, shaft 20 also carries a turbine wheel 21 consisting of a series of turbine blades which extend into the central part 15′ of bore 15 in the valve housing. This part 15′ of the bore connects the annular chamber 16 with another annular chamber 22 from which the pressure medium flows off through an outlet channel 23.

The operation of slide valve 10 is as follows: The pressure medium, for example, oil, entering through inlet channel 16 into chamber 17 flows from the latter through the central part 15′ of bore 15 into chamber 22 and then from the latter through outlet channel 23. In passsing through the central part 15′ of bore 15, the oil flows in the axial direction past the inclined blades of turbine wheel 21 and thereby turns the entire slide valve 10 about its longitudinal axis. The axial back pressure occuring by such action upon blades 21 may be utilized for influencing the servo-pressure or spring force acting upon the right end 14 of piston 12. If the control force acting upon the end surface 14 consists of a spring, the same preferably acts upon piston 12 through an antifriction thrust bearing.

Instead of providing the slide valve with a turbine wheel 21, piston 12 may also be extended to the central part 15′ of bore 15 in the valve housing and provided with helical grooves 24, as shown in FIGURE 2, starting from a point 13' corresponding to the position of control edge 13 in the embodiment according to FIGURE 1. The operation of this slide valve is identical with that shown in FIGURE 1.

Although in the two embodiments of the invention as described above, the turbine wheel 21 or the helical grooves 24 are provided directly adjacent to control piston 12 within the central bore 15', they may also be spaced therefrom or even be disposed within chamber 22 or adjacent to piston 11. Furthermore, the two pistons 11 and 12 may also be combined to form a single continuous piston member and the portion connecting the same, which would then be longer than bore 15', would then be provided with helical grooves similarly as shown in FIGURE 2.

These grooves 24 are preferably cut directly into the control piston. If the slide valve is to be equipped with turbine blades, it is more advisable to make slide valve 10 of two parts, one of which consists of piston 11, the shaft portion 20, and the turbine wheel 21, while the other part consists of piston 12. The joint between the two valve parts would therefore then lie within the same plane passing through the control edge 13, and the two parts may, for example, be screwed into each other. If the slide valve is made of two parts, the turbine wheel 21 may, however, also be made as a separate element and slipped over the shaft portion 20 and then secured thereto. The same slide valve may also be provided with two or more turbine portions or the like, which are spaced from each other, provided both turbine portions are directly acted upon by the flow of pressure medium passing through the valve housing so as to turn the slide valve in one direction.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A pressure regulating slide valve comprising a valve housing having therein an inlet chamber, an outlet chamber at one side of and spaced from said inlet chamber, a third chamber at the other side of and spaced from said outlet chamber, coaxial bores connecting the adjacent chambers with each other, an inlet conduit connected to said inlet chamber, an outlet conduit connected to said outlet chamber, and a channel connecting said inlet chamber with said third chamber, a slide member within said housing comprising at least one piston slidable in the axial direction within said bores, one part of said piston being disposed substantially within said inlet chamber and within one of said bores and having a control edge adjacent to the side wall of said inlet chamber facing toward said outlet chamber, said control edge cooperating with a seating surface defined by the intersection of said one bore and the inlet chamber to control fluid flow from the inlet chamber to the outlet chamber, a second part of said piston slidable within the other of said bores and having an end surface responsive to the fluid pressure within said third chamber exerted by a pressure medium passing through said inlet conduit, inlet chamber and connecting channel into said third chamber, resilient means acting upon said one part of said piston in one axial direction on the side opposite said control edge, and a turbine part positively connected to said slide member and disposed between said first and second piston parts and adapted to be acted upon directly by the pressure medium flowing in the axial direction from said inlet chamber to said outlet chamber and then through said outlet conduit to rotate said slide member about its axis when said pressure medium acts upon said end surface of said second piston part so as to slide said slide member in the axial direction opposite to the direction of force of said resilient means to shift said one piston part so that said control edge thereon will be disposed within said inlet chamber.

2. A pressure regulating slide valve as defined in claim 1, wherein said turbine part comprises a series of turbine blades rigidly connected to said one piston part immediately adjacent to said control edge thereon and disposed substantially within the bore between said inlet and outlet chambers.

3. A pressure regulating slide valve as defined in claim 1, wherein said turbine part is rigidly connected to said one piston part and comprises a cylindrical member disposed substantially within the bore between said inlet and outlet chambers and having a plurality of parallel helical grooves in its peripheral surface adapted to connect said inlet chamber with said outlet chamber.

4. A pressure regulating slide valve as defined in claim 3, wherein the end of each of said helical grooves adjacent said one piston part forms a part of said control edge of said one piston part.

5. A pressure-regulating slide valve comprising a valve housing having therein an inlet chamber, an outlet chamber at one side of and spaced from said inlet chamber, a third chamber at the other side of and spaced from said outlet chamber, coaxial bores connecting the adjacent chambers with each other, an inlet conduit connected to said inlet chamber, an outlet conduit connected to said outlet chamber, and a channel connecting said inlet chamber with said third chamber, a slide member within said housing including a first piston slidable in the axial direction within the bore connecting said inlet and outlet chambers and said inlet chamber, one part of said first piston being disposed substantially within said inlet chamber and having a control edge adjacent the side wall of said inlet chamber facing toward said outlet chamber, said control edge cooperating with a seating surface defined by the intersection of said bore connecting said inlet and outlet chambers and the inlet chamber to control fluid flow from the inlet chamber to the outlet chamber, a second part of said first piston being slidable in said bore connecting said inlet and outlet chambers, said second part of said first piston being constructed to form a turbine adapted to be acted upon directly by the pressure medium flowing in the axial direction from said inlet chamber to said outlet chamber, resilient means acting in the axial direction upon the surface of said one part of said first piston opposite said control edge, said slide member including a second piston slidable within the bore connecting said outlet and third chambers, said second piston having an end surface responsive to the pressure of the fluid medium in said third chamber, said resilient means and said pressure medium in said third chamber acting upon the surfaces of said first and second pistons to move said slide member axially in said bores and thereby control the placement of said control edge with respect to its seating surface, said turbine part being disposed between said first and second pistons and being so constructed and arranged as to rotate said slide member about its axis when said slide member moves in such a manner as to place said control edge within said inlet chamber and allow passage of fluid from said inlet conduit to said outlet conduit.

References Cited in the file of this patent

UNITED STATES PATENTS

| | | |
|---|---|---|
| 2,739,607 | Murray | Mar. 27, 1956 |
| 2,791,229 | Pasco | May 7, 1957 |